(12) United States Patent
Oshima et al.

(10) Patent No.: US 6,282,582 B1
(45) Date of Patent: Aug. 28, 2001

(54) COMPUTER SYSTEM, AGENT TRANSMISSION METHOD AND AGENT REACTIVATION METHOD

(75) Inventors: Mitsuru Oshima, Yamato; Kazuya Kosaka, Sagamihara, both of (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/009,481

(22) Filed: Jan. 20, 1998

(30) Foreign Application Priority Data

Jul. 29, 1997 (JP) .................................... 9-202892

(51) Int. Cl.⁷ ....................................... G06F 9/00
(52) U.S. Cl. ............................................. 709/317
(58) Field of Search ............................ 709/202, 310–332

(56) References Cited

U.S. PATENT DOCUMENTS 5,961,595 * 10/1999 Kawagoe et al. ..................... 709/223
5,991,806 * 11/1999 McHann, Jr. ........................ 709/224
6,029,175 * 2/2000 Chow et al. ......................... 707/104

OTHER PUBLICATIONS

King, James A., "Intelligent Agents: Part 2," AI Expert, pp(3), Mar. 1995.*
Petrie, Charles J., "Agent–Based Engineering, the Web, and Intelligence," IEEE Expert, pp(11), Dec. 1996.*
Etzioni et al., "Intelligent Agents on the Internet: Fact, Fiction, and Forecast," IEEE Expert, pp(10), Aug. 1995.*
Nelson et al., "Generic Support for Caching and Disconnected Operation," 4th Workshop on Workstation Operating Systems (WWOS–IV), pp. 61–65, Oct. 1993.*

* cited by examiner

*Primary Examiner*—St. John Courtenay, III
(74) *Attorney, Agent, or Firm*—Gregory M. Doudnikof

(57) ABSTRACT

The present invention provides a technique for providing high speed reactivation of an agent received by a receiving computer environment from a sending computer environment. Each agent maintains not only the names of programs necessary for its execution but also version information for the necessary programs. Preferably, each agent execution environment includes a cache mechanism which stores program code for programs that are used in agents as well as the names and the version identifiers of the programs. During the transfer of an agent, the name and version information for programs required by the agent are placed at the beginning of a bit sequence, with state data and program code following. The bit sequence is then transmitted. By employing the received name and version information, the execution environment at the destination utilizes, to the extent possible, program code that is held in the cache mechanism, or, if program code is not cached, utilizes the program code that is received.

10 Claims, 8 Drawing Sheets

COMPUTER SYSTEM, AGENT TRANSMISSION METHOD AND AGENT REACTIVATION METHOD

BACKGROUND OF THE INVENTION

1. Field of the Invention

The present invention relates to a mobile agent, and in particular to processing performed when the mobile agent is moved from one computer to another.

2. Description of the Related Art

Conventional processing performed when a mobile agent is moved will be explained while referring to FIGS. 1 and 2. A computer A (1) is connected to a network 25, and a computer B (27) is also connected to the network 25. The computers A and B, which can be any type of computer, include one or more processors and a main memory and execute various programs. A storage device, such as a hard disk drive, is optional. Since the computer A (1) and the computer B (27) perform communication across the network 25, computer A (1) also includes a communication adapter and a communication module 23 that cooperates with the adapter and the computer B (27) also includes a communication adapter and a communication module 49 that cooperates with the adapter. The computer A (1) executes a program that provides an execution environment 3 (hereinafter referred to as an agent execution environment or simply as an execution environment) for a mobile agent. A mobile agent 5a includes a program A (7) and a program B (9), which are agent programs, and a state 11 of a program, and is activated in the agent execution environment 3. The agent programs 7, 9 define the activity of the agent 5a, and are machine code that is interpreted/executed by a processor, classes in an object-oriented programming system, or source programs that are translated and executed by an interpreter. The state 11 of a program is represented by variables used in a program, a stack frame, or the like.

As shown in FIG. 1, an agent program includes one or more programs, and each program constituting the agent program has a mechanism (a pointer) that is used to refer to corresponding program code. That is, as shown in FIG. 1, program codes that correspond to the program A (7) and the program B (9), constituting the agent Sa, are stored as program code A (15) and program code B (17) in a cache 13, which is provided in the agent execution environment 3. The program code for the agent that was moved is held in the cache 13 for a predetermined period of time, together with the program code for an agent under the management of the agent execution environment 3. In FIG. 1, for example, program code X (19) is code for the agent that was moved. The cache 13 is not necessarily provided in the main memory of the computer A (1); program code may be stored in another storage device in the computer A (1).

The agent execution environment 3 is a program that provides a required computer resource and a service for the activity of the mobile agent 5a, and that includes a control mechanism for controlling the generation, the halting and the movement of an agent, and that stores, as state information, a mobile agent and management information for it The execution environment 3 reads program code, which is the source of a program, converts it into the program and executes the obtained program. When the agent execution environment 3 executes the program code unchanged, the program and the program code may be the same. The agent execution environment 3 communicates via the communication module 23 with an execution environment in another computer that is connected to the network 25. The individual agent execution environments have names uniquely determined on the network 25, arid the communication modules can employ these names to specify an agent execution environment with which to communicate. An execution environment 29 in the computer B (27) corresponds to the execution environment 3. The communication module 49 in the computer B (27) also corresponds to the one in the computer A (1). It should be noted that in FIG. 1 only the components that are required for moving the agent 5a from the computer A (1) to the computer B (27) are shown.

An operation performed when the agent 5a moves from the computer A (1) to the computer B (27) will now be explained. When a request for a move is issued to the execution environment 3 by the agent 5a or an external entity, the execution environment 3 halts the execution of the agent 5a, and a bit sequence generation module 21 converts the state of the agent 5a and program code used by the agent 5a into a bit sequence for transmission (or a transmission bit sequence). A move destination is included in the movement request. Since the state 11 of the program depends on the program code, during reproduction of the execution state, first the program code should be read and re-constructed in the execution environment 29, then the state 11 should be read and re-constructed. Therefore, during the transfer of a bit sequence, generally, as shown in FIG. 2, a bit sequence for the program code is transferred first and the bit sequence for the state 11 of the program is transferred last.

A transmission bit sequence (FIG. 2), which is generated by the bit sequence generation module 21, is transmitted to the communication module 49 in the computer B (27), which provides the bit sequence to the execution environment 29 at the destination computer B (27). The communication module 49 transmits the received bit sequence to an agent restoring module 39. The agent restoring module 39 regenerates the program code to obtain a program A (33) and a program B (35) for the agent 5b. Further, a bit sequence related to the received state 11 is re-built in accordance with the generated program A and the program B to provide a state 37 for the agent 5b. As a result, the agent restoring module 39 reactivates the agent 5b in the execution environment 29. The program code A (43) and program code B (45) are also provided to and stored in the cache 41, and respectively correspond to the program A (33) and the program B (35) in the agent 5b. In addition, program code Y (47) is held in the cache 41.

In a conventional agent moving operation, the agent cannot be reactivated by a destination computer until after all the bit sequences have been received from a source computer. Thus, the agent moving operation requires an extended period of time.

One method for transferring information is a cache technique whereby previously received program code is held, and when program code having the same name is present, it is re-used to improve the efficiency. However, (1) a version may differ even though the program code has the same name, and whether or not it is a desired program code cannot be determined; and (2) normally, a requesting source cannot in advance acquire accurate information as to which cache is present at a transfer destination. Therefore, it is difficult to determine which program code should be transferred.

A mobile agent is described in detail in U.S. Pat. No. 5,603,031. In this patent document, a technique is described whereby a digest is transmitted as an object for an agent that was exchanged once, and the object itself is not transferred. It is, however, not clear how long the identity of the object can be preserved, even though it is one of the agents that were once exchanged. If the identity is maintained, additional effort is required.

SUMMARY OF THE INVENTION

Therefore, one object of the present invention is to reduce the length of the time required for the moving of an agent from one execution environment to another.

Another object of the present invention is to employ fewer processes so as to reduce the length of time required for the moving of an agent.

Yet another object of the present invention is to reduce the time required to reactivate an agent received by one computer from another computer.

The present invention improves the prior art mechanism shown in FIG. 1 as follows. Each agent maintains not only the name of a program but also version information for the program code. Each agent execution environment maintains in a cache mechanism the name and the version of a program, and the program code that corresponds to the program. When preparing an agent for transmission, the name and the version information are placed at the beginning of the bit sequence, and then state data and finally program code follow in the bit sequence. By employing the received name and received version information, the execution environment at the destination utilizes, to the extent possible, program code that is maintained in its cache mechanism, or, if program code is not cached, utilizes the program code that is received in the bit sequence.

Alternatively, the program code is not transmitted to a destination execution environment in an initial bit sequence. Only program code that is not found to be present at the destination execution environment is transmitted. According to another embodiment, the name and version information of a program, state data and positional information for program code are transmitted to a destination execution environment. If the program code is not present at the destination, the destination execution environment automatically employs the positional information (for the program code) to acquire the program code.

To summarize the above description, according to one aspect of the present invention, an execution environment for agents comprises a cache mechanism for storing names and version identifiers for agent programs and program code corresponding to each of the agent programs; a module for, in response to a request to transfer a first agent, reading program code from the cache mechanism which corresponds to agent programs for the first agent; and a conversion module for converting the name and the version identifier of the agent programs of the first agent, state data for the first agent and the program code read from the cache mechanism into a bit sequence for transmission, the bit sequence having the name and the version identifier situated at the beginning thereof, the state data next, and the program code following the state data. As a result, a transmission destination can read required program code from its own cache by using the name and the version identifier that are received first in the bit sequence. Since the agent can be reactivated by using the sequentially received state data, the time required for the reactivation of the agent can be reduced. Even when the required program code is not maintained in the cache of the destination, the agent can be reactivated in the same period of time as the prior art technique.

When the agent program of the first agent comprises a plurality of programs, each having its own corresponding program code, the conversion module may arrange the order of the program code in the bit sequence in a descending order of probability by which the program code may not be available in the destination execution environment of the first agent Therefore, even when the program code is not present in the cache at the destination, the agent can be reactivated more rapidly.

The descending order of probability regarding the availability of the program code in the destination execution environment may be the order in which the program code for each program has been generated; i.e., the program code that was last to be generated/created is sent first. Alternatively, the order may be determined based on whether the programs have been previously transmitted to the destination execution environment earlier. The program code for a program(s) which has not been previously transmitted is placed first in the bit sequence and program code for program(s) that have been transmitted follows. Further, additional benefits can be obtained by arranging the program code for the programs to be transmitted in ascending order in accordance with size.

According to another aspect of the present invention, an execution environment for agents comprises a cache mechanism for storing a name and a version identifier for each program in a first agent and program code corresponding to each of the programs; and a conversion module for, in response to a request to transmit the first agent, converting the name and the version identifier of each of the programs of the first agent and state data for the first agent into a first bit sequence for transmission. If the program code for any of the programs is found to be present in the cache at a destination, this program code will not be transmitted. When a name and a version identifier of a necessary agent program are received from the destination execution environment to which the first agent is being transferred, a module for reading, from the cache mechanism, program code corresponding to the received name and the received version identifier is provided. The conversion module converts the program code read from the cache mechanism into a second bit sequence for transmission to the destination execution environment.

According to an additional aspect of the present invention, an execution environment for agents comprises a conversion module for, in response to a request to move a first agent, converting a name and a version identifier for agent programs required by the first agent, positional information for program code which comprises each of the agent programs of the first agent, and state data for the first agent into a bit sequence for transmission. Since a destination execution environment can acquire required program code that is not held in its own cache so long as program code positional information is transmitted, there is no need for the program code to be transmitted.

The features of an execution environment which receives agents in accordance with the present invention will now be described. An execution environment for receiving agents comprises a cache mechanism for storing a name and a version identifier of at least one agent program and program code corresponding to each of the agent programs; a retrieval module for, upon reception of a name and a version identifier of an agent program for a first agent that is being moved to the execution environment, reading from the cache mechanism program code corresponding to the name and the version identifier of the agent program, if any; a program defining module for generating the agent program for the first agent from the program code; and a state restoring module for restoring a received state for the first agent. The execution environment may further comprise a module for, when the retrieval module cannot read from the cache mechanism all of the program code of the agent program, outputting the program code from a bit sequence of the first agent received from a transmitting execution environment to the program defining module.

Alternatively, the execution environment may further comprises a module for, when the retrieval module cannot read from the cache mechanism all of the program code for the first agent, transmitting the name and the version identifier for the program code not retreived from the cache to a transmitting execution environment requesting that the program code be transmitted to the receiving execution environment.

The execution environment may alternatively further comprise a module for, when the retrieval module cannot read from the cache mechanism all of the program code for the first agent, employing received program code positional information to acquire of the program code that cannot be read from the cache mechanism.

The present invention described above can be understood from the processing flowcharts provided herein. The present invention may be implemented employing a computer program. Such a computer program would be stored in a storage medium, such as a CD-ROM or a floppy disk, for distribution, or may distributed over a network from one computer system to another.

DESCRIPTION OF THE PREFERRED EMBODIMENT

Figure 1:
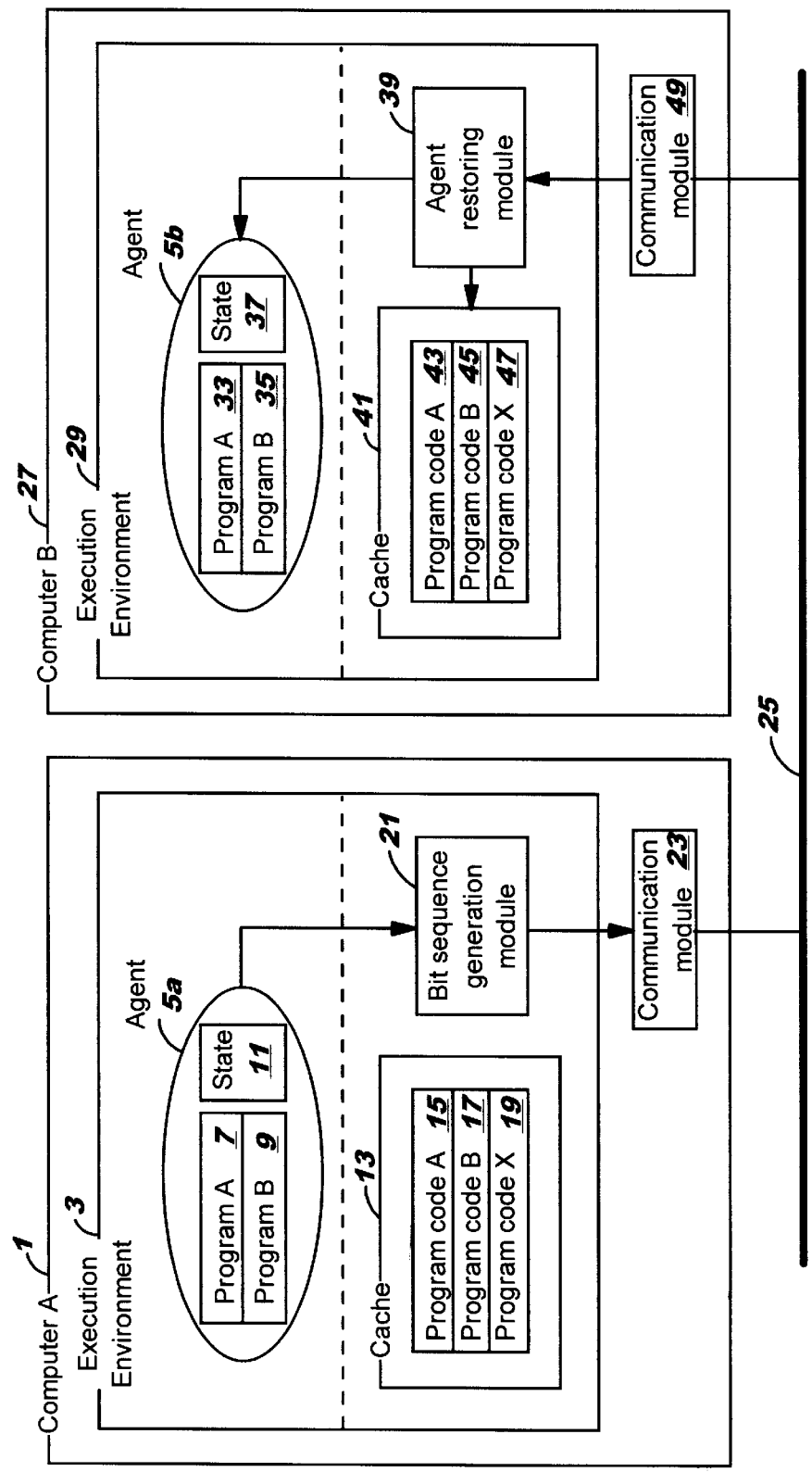
FIG. 1 is a diagram illustrating a conventional prior art process for moving an agent.
Figure 2:
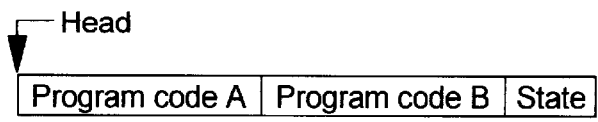
FIG. 2 is a diagram illustrating a conventional prior art bit sequence transmitted upon moving the agent between execution environments.
Figure 3:
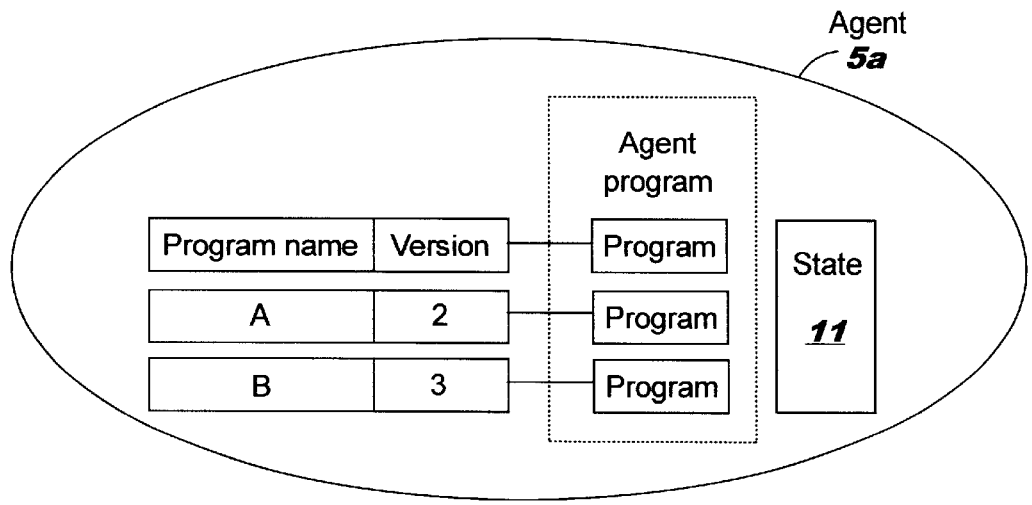
FIG. 3 is a block diagram illustrating an example arrangement of an agent according to the present invention.

The structure of an agent according to the present invention is shown in FIG. 3. The same reference numerals are used to denote elements that are similar to those described relative to FIG. 1. An agent 5a includes an agent program, a state 11 and a name and a version identifier for the agent program. In FIG. 3, the agent program includes a program A and a program B, the names of which are A and B. The version identifier for the program A is 2 and the version identifier for the program B is 3. The version identifier is information that uniquely correlates with a version of a program in a group of programs having the same name, but which differ from each other. The version identifier may be either a number or another symbol.

Figure 4:
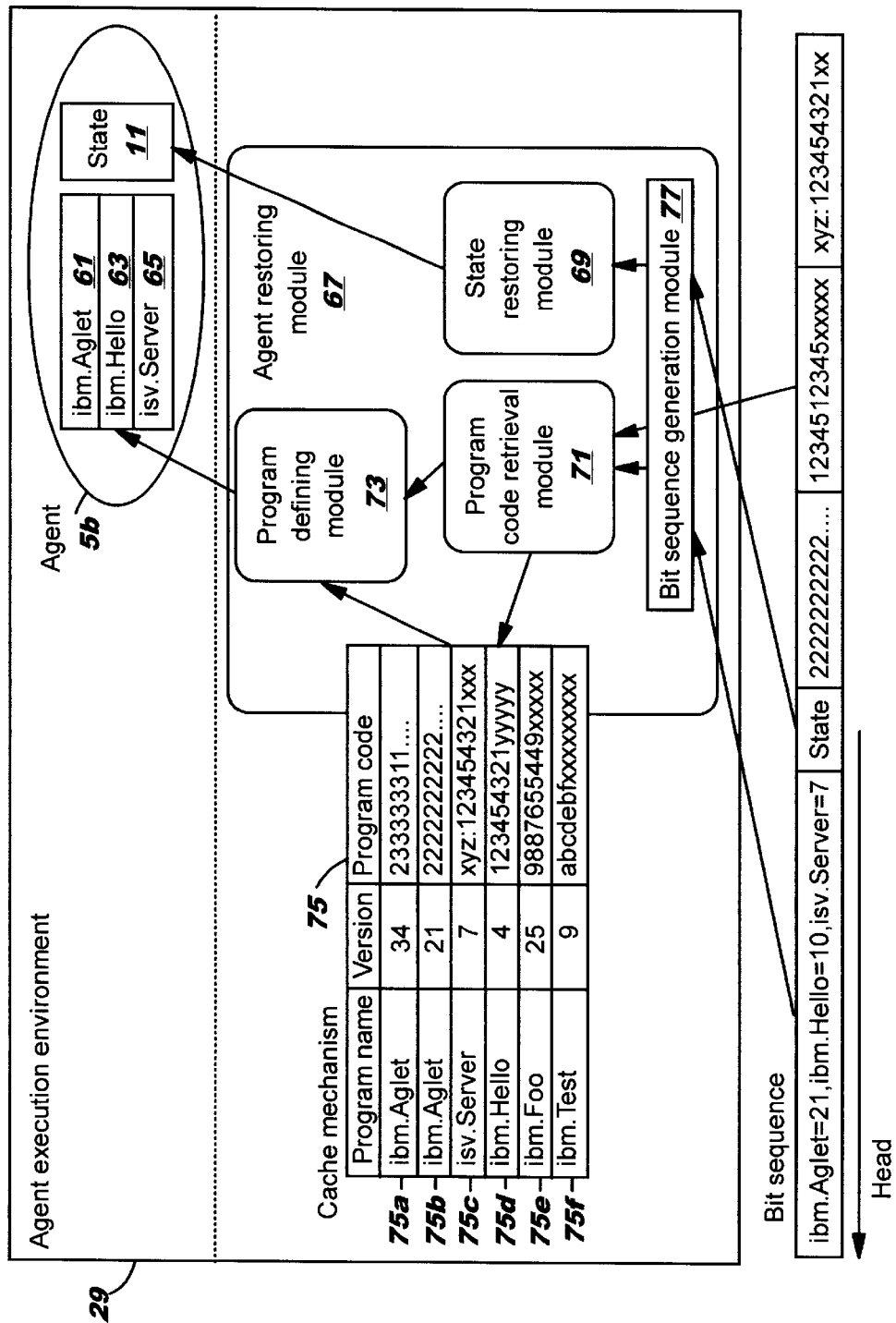
FIG. 4 is a block diagram illustrating an example agent transmitting execution environment according to the present invention.

An execution environment wherein the agent 5a is activated will be explained while referring to FIG. 4. An execution environment 3 for an agent executed by a computer A includes a cache mechanism 59 for holding program code and an agent conversion module 51. The agent conversion module 51 has a program code retrieval module 53, a state extraction module 55 and a bit sequence generation module 57. In FIG. 4, the agent program itself for the agent 5a is not shown, whereas names and version identifiers 61, 63, 65 of the programs which are included in the agent program are shown.

The cache mechanism 59 holds program code for the programs that has been used or is being used by an agent, and corresponding program code can be read for each program by using two types of information; namely, the name and the version identifier of a program. The cached program code need not be stored permanently, and may be deleted at an arbitrary time when the agent using that program code no longer exists. An arbitrary deletion method can be employed, but since this is not related to the subject of the present invention, no further explanation for it will be provided.

Figure 5:
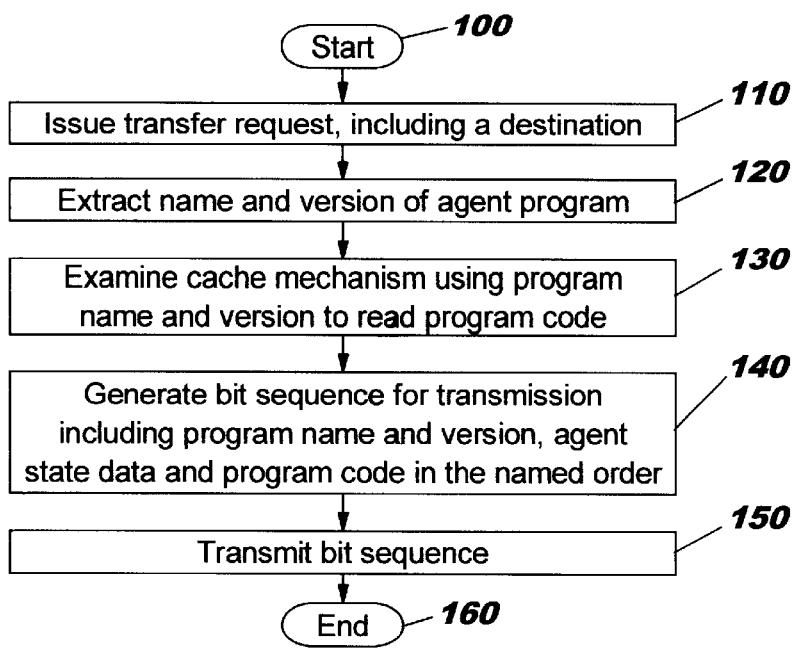
FIG. 5 is a flowchart which illustrates the processing performed in the environment illustrated in FIG. 4.

The processing carried out in the system illustrated in FIG. 4 will now be described while referring to the flow chart of FIG. 5. The agent 5a issues a request for movement, dispatch(d1), to the agent execution environment 3 (Step 110). Here, d1 is the name of destination agent execution environment. Alternatively, a component in the computing environment other than the agent may issue the move request. Upon the receipt of the move request, the agent execution environment 3 halts the execution of the agent 5a and acquires the names and the version identifiers of the programs used in the agent 5a (Step 120). In the example in FIG. 4, the program 61 has a name "ibm.Aglet" and a version identifier "21". The program 63 has a name "ibm.Hello" and a version identifier "10," and the program 65 has a name "isv.Server" and version identifier "7". These names and version identifiers are extracted. The names and the version identifiers of the programs 61, 63, 65 are transmitted to the program code retrieval module 53. The retrieval module 53 examines the cache mechanism 59 by using the names and the version identifiers of the programs as keys and acquires the required program code (Step 130). In the example in FIG. 4, program codes 59b, 59c and 59d are read from the cache mechanism 59. The retrieval module 53 transmits, as independent information, the names and the version identifiers of the programs, as well as the program code corresponding to the programs read from the cache mechanism 59, to the bit sequence generation module 57.

State data in the agent 5a is extracted by the state extraction module 55, which transmits the state data to the bit sequence generation module 57. As shown in FIG. 4, the bit sequence generation module 57 arranges the names and the version identifiers of the programs first in the bit sequence, the state data second, and the program code last, thereby generating a bit sequence for transmission (Step 140). The bit sequence is transmitted to the communication module 23 (FIG. 1), which transmits the bit sequence to the destination d1 (Step 150).

Figure 6:
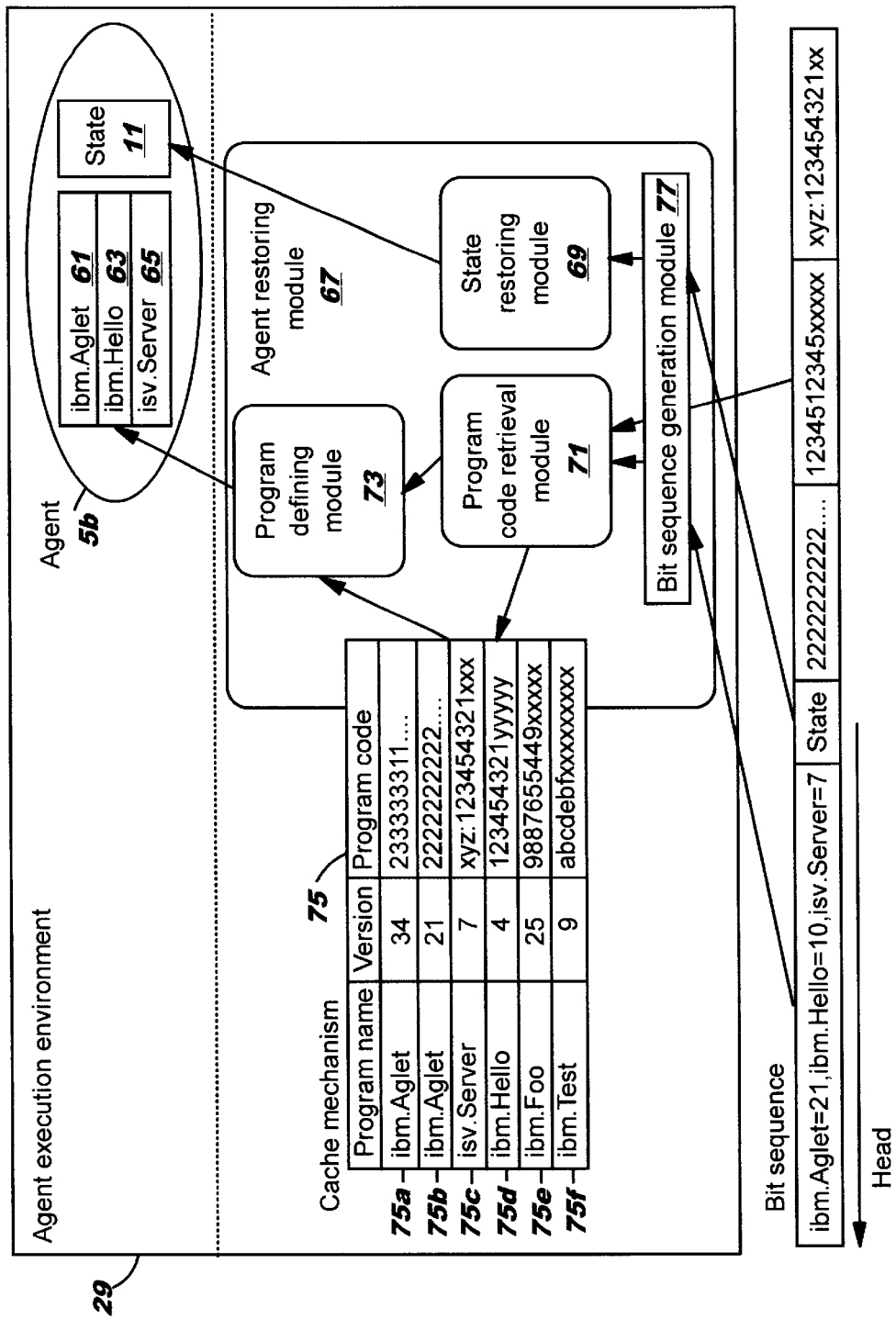
FIG. 6 is a block diagram illustrating an agent execution environment for receiving an agent according to the present invention.

A preferred structure for a destination execution environment 29 at a destination of the agent 5a is illustrated in FIG. 6. The execution environment 29 includes a cache mechanism 75 and an agent restoring module 67. The agent restoring module 67 includes a bit sequence analysis module 77, a program code retrieval module 71, a state restoring module 69, and a program defining module 73. Although t he cache mechanism 75 performs processing in the same manner as the cache mechanism 59 (FIG. 4) of the agent execution environment which transmits an agent, it does not necessarily have the same program code stored therein.

Figure 7:
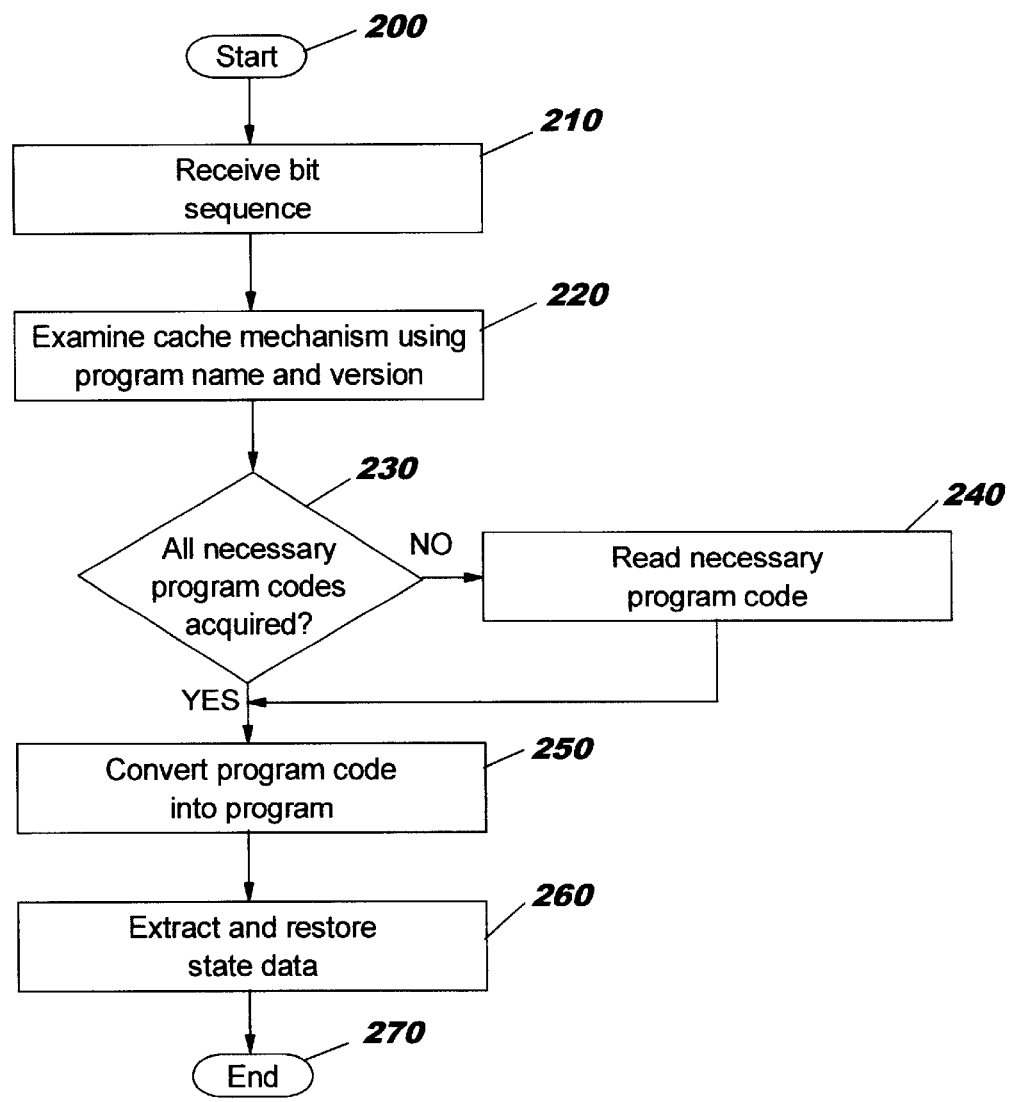
FIG. 7 is a flowchart which illustrates the processing performed in the environment illustrated in FIG. 6.

The processing carried out in the receiving system illustrated in FIG. 6 will now be described while referring to the flow chart of FIG. 7. The execution environment 29 at the destination of the agent 5a receives a bit sequence by means of a communication module, such as the communication module 49 of FIG. 1 (Step 210). The received bit sequence is stored in a buffer. The bit sequence analysis module 77 analyzes the received bit sequence, and extracts the names and the version identifiers of the necessary programs and transmits them to the program code retrieval module 71. It should be noted that the operation of the bit sequence analysis module 77 is begun upon the reception of the names and the version identifiers of the programs. The state data for the agent 5a is transmitted to the state restoring module 69. At this time, received program code for the programs need not be read out. The program code retrieval module 71 examines the cache mechanism 75 to acquire program code corresponding to the names and the version identifiers of the programs (Step 220). In the example in FIG. 6, program code 75b and 75c in the cache mechanism 75 correspond to the received names and the version identifiers for two of the required programs.

Following this, the program code retrieval module 71 determines whether or not all the necessary program code has been read from the cache mechanism 75 (Step 230). If all the necessary program code has not been read from the cache mechanism 75, the code is read from the bit sequence stored in the buffer (Step 240). In the example illustrated in FIG. 6, the particular program code for the program 63 named ibm.Hello and having version identifier 10 is not held in the cache mechanism 75. Accordingly, the program code for the program 63 is read from the bit sequence. In this way, program code is read from the cache mechanism 75 only as needed. The program code for the necessary programs is transmitted to the program defining module 73. The program defining module 73 converts the received program code into executable program(s) (Step 250). When all of the programs to be used by the agent 5b are prepared, the agent state restoring module 69 restores the state data received from the bit sequence analysis module 77 as the state corresponding to the programs 61, 63, 65, and reactivates the entire agent (Step 260).

As a result of the above processing, when part of the total program code required for reactivating an agent is present in a cache mechanism, the agent can be reactivated without reading all the program code in the received bit sequence, so that the time from the beginning of a transfer until the reactivation of an agent can be reduced.

In the above described embodiment, no consideration is given to the order of the programs in the bit sequence transmission. However, since the transmitted program code is employed when the required program code is not held in a cache mechanism at a destination, the agent can be resumed faster by taking into account the order of transmission of the program code. The order in which program codes for the necessary programs is transmitted will now be explained.

Basically, the program code for the programs should be transmitted in a descending order of the probability that they may not be present in the cache mechanism at an agent transfer destination, with the program code for the program most likely to be present in the cache mechanism being transmitted in the bit sequence last. This probability is determined by using the dates which indicate when the program code for each program was generated, a list of names and version identifiers of the program code for programs that have been transmitted to the destination, and so on. This technique is based on the premise that program code that was generated relatively recently is less likely to have been transmitted to the destination already, while older program code has a greater liklihood of having been transmitted. Therefore, the cache mechanism at the transmission source, or the agent, may maintain data concerning program code generation dates as well as the names and the version identifiers of the programs, and the bit sequence generation module 57 may arrange the order of the data in the bit sequence based on the date information.

Preferably, each time an agent is transmitted to a transfer destination, the transfer destination, as well as the name and the version identifier of the program code that was transferred, is stored in the cache mechanism other a storage device. Upon a subsequent transfer of an agent, information concerning the transfer destination is employed to determine whether or not the code was transmitted before. If the program code for a particular program was transmitted before, it may be placed at the end of the transmission bit sequence.

A method for arranging the program code for programs in an ascending order according to size can also be employed. Then, even when program code placed at the head of the bit sequence is not used, transfer waste can be reduced.

Figure 8:
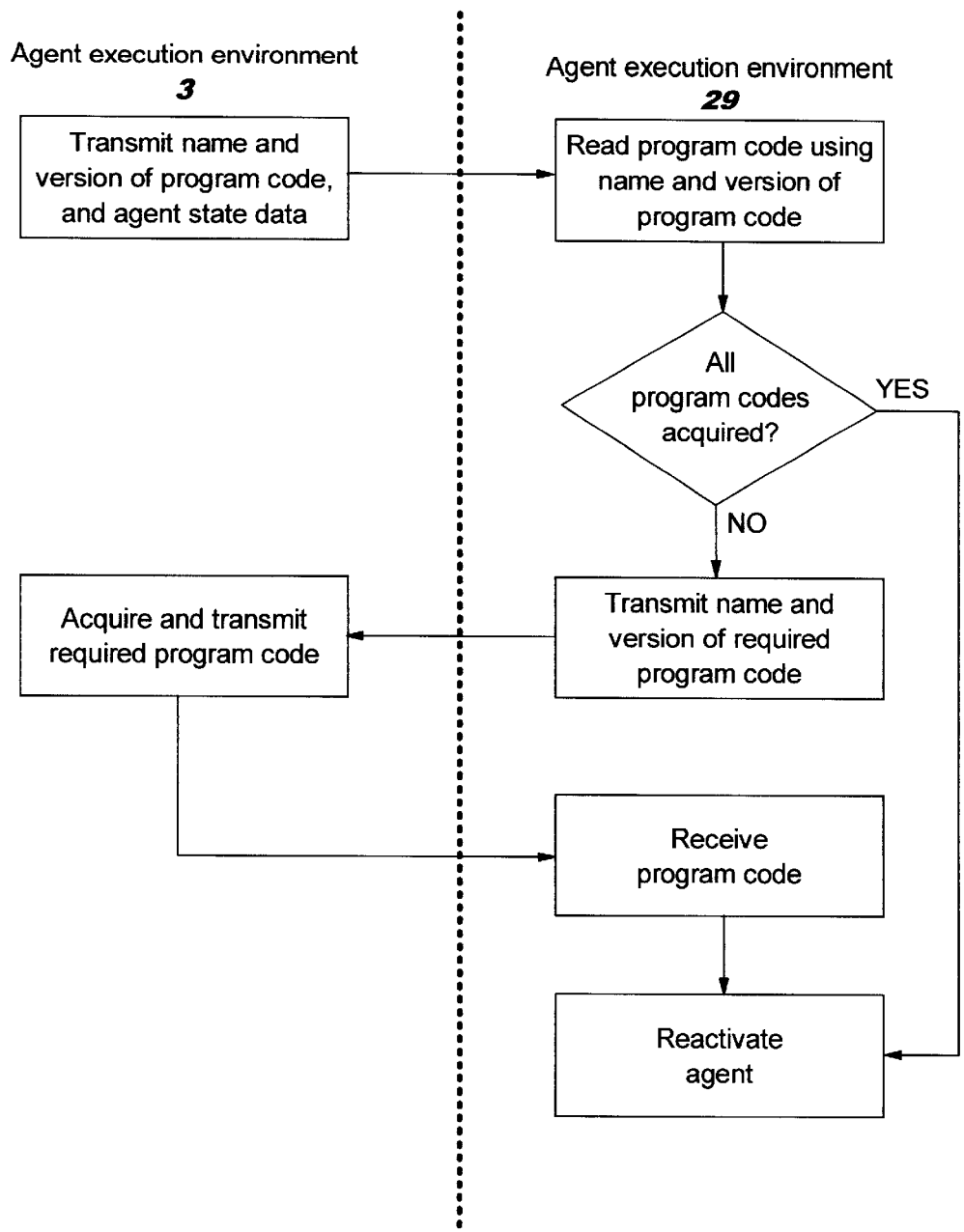
FIG. 8 is a flowchart for explaining an operation performed according to a second embodiment of the present invention.

According to another embodiment of the present invention, a bit sequence generation module 57, in an agent execution environment at a transmission source, transmits only the names and the version identifiers of programs and the state data for an agent in the bit sequence. In this case, a module has to be provided in the receiving agent execution environment for returning to the transmission source the names and the version identifiers of programs that the program code retrieval module 71 cannot find in the cache mechanism 75. For the program code that cannot be read, the program code retrieval module 53 in the agent execution environment at the transmission source extracts the program code that corresponds to the name and the version identifiers of the required programs. The bit sequence generation module 57 converts the program code for each program into a bit sequence for transmission, and the communication module 23 transmits the bit sequence to the receiving agent execution environment. The processing steps for this embodiment are shown in the flow chart of FIG. 8.

Figure 9:
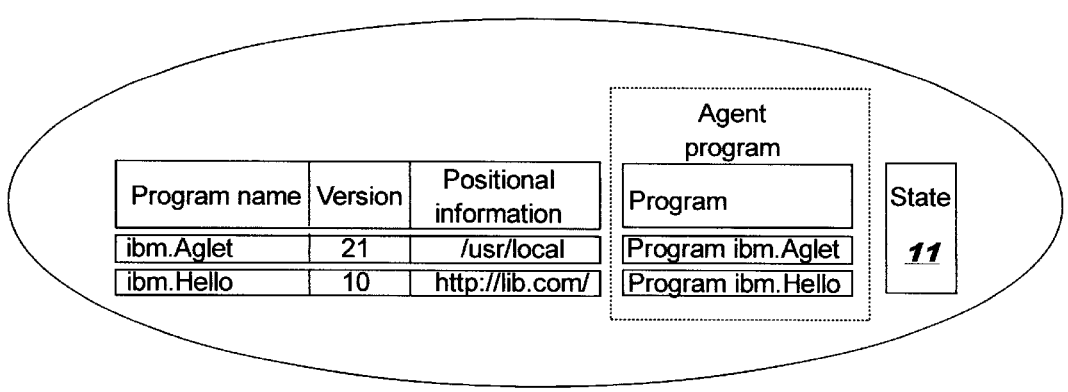
FIG. 9 is a diagram for explaining the arrangement of an agent according to a third embodiment of the present invention.
Figure 10:
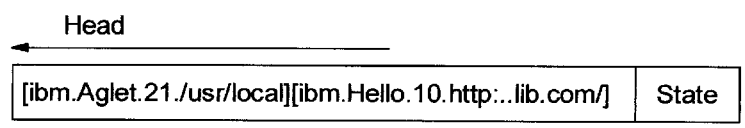
FIG. 10 is a diagram for explaining the structure of a bit sequence for transmission according to the third embodiment of the present invention.

According to an additional embodiment of the present invention, a bit sequence generation module 57 in an agent execution environment at a transmission source transmits the name and the version identifier of a program, state data for an agent and program code positional information. The positional information describes the location at which the program code is stored, and may be, for example, path information in a file system in a computer system or a URL (Uniform Resource Locator) used for the WWW (World Wide Web). FIG. 9 is a block diagram showing an agent for this embodiment. Each program included in an agent program has a name and a version identifier of the program and positional information maintained in the agent. In the example illustrated in FIG. 9, a program whose name is "ibm.Aglet" has a version identifier "21", and its position information is "/use/local". A program whose name is "ibm.Hello" has a version identifier "10" and its positional information is "http://lib.com/". A bit sequence generation module 57 in an agent execution environment at the transmission source extracts the above described data from the agent, receives agent state data from a state extraction module 55, and generates a bit sequence for transmission, as shown in FIG. 10. While in this embodiment the program code positional information is placed first in the bit sequence together with the name and the version identifier of a program, the positional information may be located following the state data.

Figure 11:
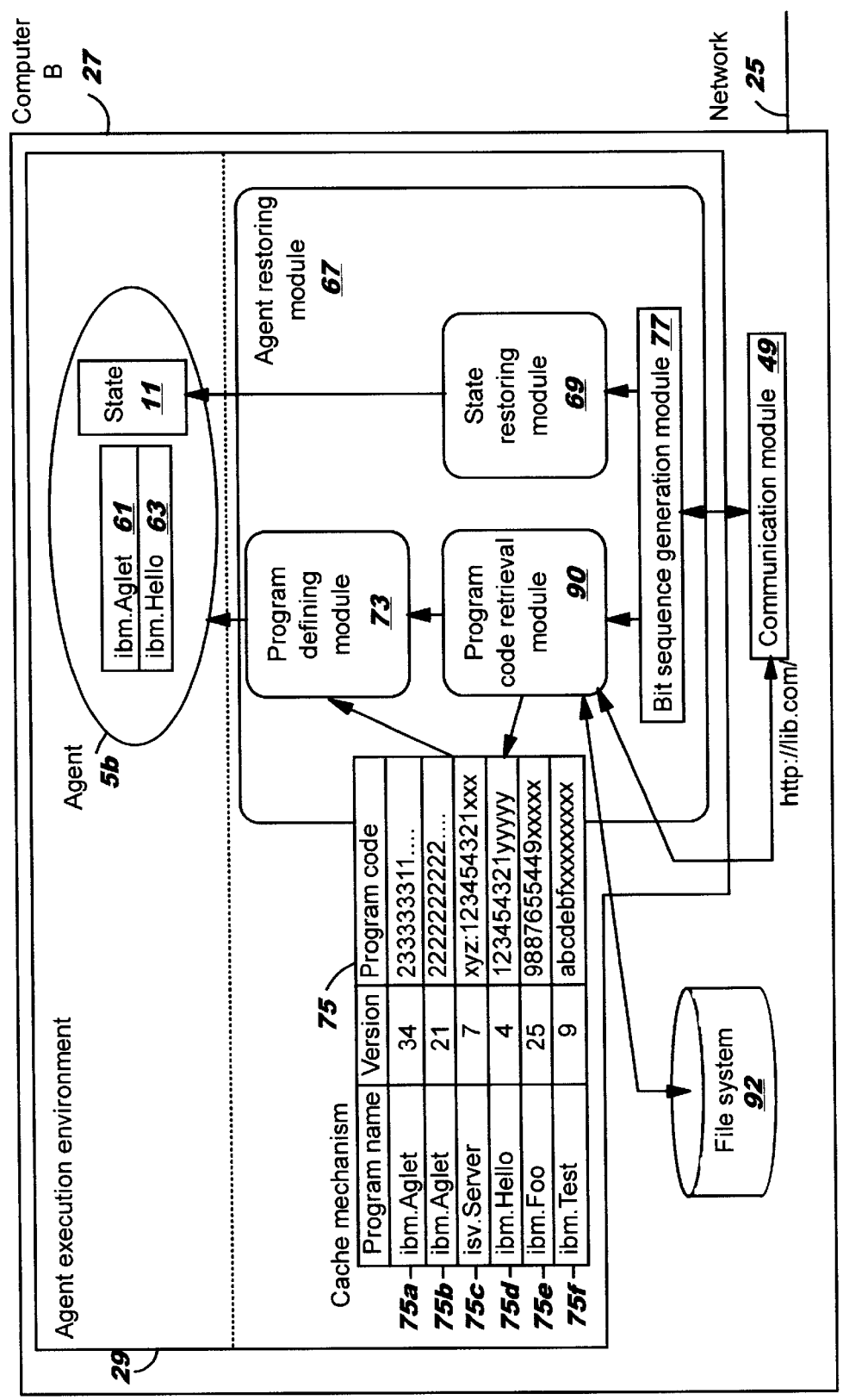
FIG. 11 is a diagram for explaining the arrangement of an agent receiving environment according to another embodiment of the present invention.

A computer B (27) which serves as a transmission destination for an agent is illustrated in FIG. 11. In an agent execution environment 29, a program code retrieval module 90 within an agent restoring module 67 differs from the module 71 of FIG. 6. The program code retrieval module 90 examines the cache mechanism 75 by employing the names and the version identifiers of the programs received in the bit sequence shown in FIG. 10. When required program code can be read from the cache mechanism 75, it is transmitted to a program defining module 73. When required program code is not found in the cache mechanism 75, it is retrieved by using the positional information contained in the bit sequence. In the example in FIG. 11, when positional information is "/use/local", program code is extracted from a file system 92 in the computer B (27). When the positional information is "http://lib.com/", the program code retrieval module 90 instructs a communication module 49 to connect to a server at the address, and retrieves the required program code from the server at this address. While the cache mechanism 75 is employed in this embodiment to store program code, the positional information in the bit sequence can be employed to retrieve the required program code to begin with. Since the amount of information to be transmitted from the agent transmission source is reduced, the load placed on the network is also reduced. So long as the required program code is present in a local file system at a destination, the effect that the program code need not be transferred again across the network.

The above described embodiments are provided as examples only. An arbitrary method for providing modules for an agent execution environment can be employed and the effect of the present invention can be obtained so long as the above described functions are performed. The agent execution environment normally serves as both a transmission environment and a receiving environment. In this case, a single execution environment holds the functions of both the execution environment 3 in FIG. 4 and the execution environment 29 in FIG. 6. However, the execution environment may have only one function when employed as either a transmission environment or a receiving environment, as shown in FIGS. 4 and 6.

What is claimed is:

1. A computer system connected to a network, said computer system having an execution environment for agents, said execution environment comprising:
   a cache mechanism for storing name and version identifiers for agent programs and program code corresponding to each of the said agent programs;
   a module for, in response to a request to transfer a first agent, reading from said cache mechanism program code corresponding to agent programs employed by the first agent; and
   a conversion module for converting the name and the version identifier of the agent programs of the first agent, state data for the first agent and the program code read from said cache mechanism into a bit sequence for transmission, the bit sequence having the name and the version identifier placed first therein at a head of the bit sequence, the state data next, and the program code following the state data,
   wherein when the first agent includes a plurality of agent programs, said conversion module arranges the program code for the programs in a descending order of probability that the program code for each of the programs may not be available in a destination execution environment for the first agent.

2. The computer system according to claim 1, wherein said descending order of probability is the order in which the program code for each of the programs was generated.

3. The computer system according to claim 1, wherein said descending order of probability causes program code that has not been transmitted to the destination execution environment to be placed in the bit sequence in front of program code that has been transmitted to the destination execution environment previously.

4. A computer system connected to a network, said computer system having an execution environment for agents, said execution environment comprising:
   a cache mechanism for storing name and version identifiers for agent programs and program code corresponding to each of the said agent programs;
   a module for, in response to a request to transfer a first agent, reading from said cache mechanism program code corresponding to agent programs employed by the first agent; and
   a conversion module for converting the name and the version identifier of the agent programs of the first agent, state data for the first agent and the program code read from said cache mechanism into a bit sequence for transmission, the bit sequence having the name and the version identifier placed first therein at a head of the bit sequence, the state data next, and the program code following the state data,
   wherein when the first agent includes a plurality of programs, the program code for each of the programs is arranged in the bit sequence in order in accordance with size.

5. A computer system connected to a network, said computer system having an execution environment for agents from which the agents may be transmitted, said execution environment comprising:
   a cache mechanism for storing a name and a version identifier for each program in a first agent and program code corresponding to each of the programs;
   a conversion module for, in response to a request to transmit the first agent, converting the name and the version identifier of each of the programs of said first agent and state data for said first agent into a first bit sequence for transmission; and
   a communication mechanism for communicating with other computers,
   wherein said cache mechanism further stores positional information for the program code, and wherein said conversion module further converts positional information for the program code for each of the programs into the first bit sequence for transmission.

6. The computer system according to claim 5, further comprising:
   a module for, when a name and a version identifier of a program are received from a receiving execution environment to which said first agent has been transmitted, reading, from said cache mechanism, program code corresponding to said name and said version identifier of the program, wherein said conversion module converts the program code for the program read from said cache mechanism into a second bit sequence for transmission.

7. A computer system connected to a network, said computer system having an execution environment for agents, said execution environment comprising:

a cache mechanism for storing a name and a version identifier for agent programs, and program code corresponding to each of the agent programs;

a retrieval module for, upon receipt by said execution environment of a name and a version identifier of an agent program for a first agent being transmitted to said execution environment, reading from said cache mechanism the program code which corresponds to said name and said version identifier for the agent program, if the program code is present in said cache mechanism;

a program defining module for generating the agent program from the read program code;

a state restoring module for restoring a state for first agent; and a module for, when said retrieval module cannot read from said cache mechanism the program code which corresponds to said name and said version identifier of the agent program, outputting the program code for the agent program from a bit sequence transmitting the first agent to said execution environment.

8. A computer system connected to a network, said computer system having an execution environment for agents, said execution environment comprising:

a cache mechanism for storing a name and a version identifier for agent programs, and program code corresponding to each of the agent programs;

a retrieval module for, upon receipt by said execution environment of a name and a version identifier of an agent program for a first agent being transmitted to said execution environment, reading from said cache mechanism the program code which corresponds to said name and said version identifier for the agent program, if the program code is present in said cache mechanism;

a program defining module for generating the agent program from the read program code;

a state restoring module for restoring a state for first agent; and a module for, when said retrieval module cannot read from said cache mechanism the program code which corresponds to said name and said version identifier of the agent program, transmitting said name and said version identifier of the agent program to a transmitting execution environment and requesting transmission of the corresponding program code.

9. A computer system connected to a network, said computer system having an execution environment for agents, said execution environment comprising:

a cache mechanism for storing a name and a version identifier for agent programs, and program code corresponding to each of the agent programs;

a retrieval module for, upon receipt by said execution environment of a name and a version identifier of an agent program for a first agent being transmitted to said execution environment, reading from said cache mechanism the program code which corresponds to said name and said version identifier for the agent program, if the program code is present in said cache mechanism;

a program defining module for generating the agent program from the read program code;

a state restoring module for restoring a state for first agent; and a module for, when said retrieval module cannot read from said cache mechanism the program code which corresponds to said name and the said version identifier of the agent program, employing positional information for the program code to acquire the program code.

10. In a networked computing environment, a method for transmitting an agent from a first computer system to a second computer, wherein the first and second computer systems are connected to a network and have an execution environment for agents, said method comprising the steps of:

in response to a request to transfer a first agent from the first computer system to the second computer system, reading from a cache mechanism program code corresponding to agent programs of said first agent; and transmitting a name and a version of each of said agent programs of said first agent, state data for said first agent, and said program code read from said cache mechanism to the second computer system, wherein when the first agent includes a plurality of agent programs corresponding to the first agent, program code for each of the agent programs are arranged in a descending order of probability that the program code for each agent program may not be available in the execution environment of the second computer system.

* * * * *